United States Patent [19]

Bailey et al.

[11] Patent Number: 5,497,460

[45] Date of Patent: Mar. 5, 1996

[54] SYSTEM AND METHOD FOR DETERMINING NETWORK CONNECTIVITY

[75] Inventors: Warren D. Bailey, Pittsboro; Erik L. Dixon, Durham; Michele M. Ferris, Cary; Henry M. Garrett, Raleigh; Gregory F. Paussa, Cary; Anthony D. Walker, Durham, all of N.C.

[73] Assignee: International Business Machines Corporation, Armonk, N.Y.

[21] Appl. No.: 262,197

[22] Filed: Jun. 20, 1994

[51] Int. Cl.$^6$ .................................................. G06F 11/34
[52] U.S. Cl. ...................................... 395/183.15; 370/85.4
[58] Field of Search .................................... 395/575, 500, 395/725, 182.02, 183.15, 183.19; 370/85.4, 85.7, 85.14, 85.15

[56] References Cited

U.S. PATENT DOCUMENTS

| | | | |
|---|---|---|---|
| 4,999,833 | 3/1991 | Lee | 370/94.1 |
| 5,077,732 | 12/1991 | Fischer et al. | 370/85.4 |
| 5,117,422 | 5/1992 | Hauptschein et al. | 370/95.1 |
| 5,195,085 | 3/1993 | Bertsch et al. | 370/13 |
| 5,208,803 | 5/1993 | Conforti et al. | 370/13 |
| 5,222,062 | 6/1993 | Sharma et al. | 370/56 |
| 5,247,464 | 9/1993 | Curtis | 364/562 |
| 5,247,517 | 9/1993 | Ross et al. | 370/85.5 |
| 5,251,204 | 10/1993 | Izawa et al. | 370/15 |
| 5,251,213 | 10/1993 | Videlock et al. | 370/85.12 |
| 5,265,241 | 11/1993 | Arnold et al. | 395/575 |
| 5,285,449 | 2/1994 | Georgious | 370/85.13 |
| 5,301,303 | 4/1994 | Abraham et al. | 395/500 |
| 5,317,568 | 5/1994 | Bixby et al. | 370/85.6 |
| 5,379,296 | 1/1995 | Johnson et al. | 370/85.13 |

OTHER PUBLICATIONS

Heinzmann "Configuration Control for Bus Networks" 1900 IEEE pp. 49–59.

Primary Examiner—Robert W. Beausoliel, Jr.
Assistant Examiner—Albert Decady
Attorney, Agent, or Firm—Stephen T. Keohane

[57] ABSTRACT

A system (such as a multiprotocol LAN adapter) for use in a workstation or other processing machine automatically determines the type of network to which the workstation is connected and for automatically determines the type of physical medium to which the workstation is attached. The system has a plurality of different physical ports for supporting various available physical media over which network data may be transmitted. For example, the system may have a port for connecting to shielded twisted pair (STP) wiring, a port for connecting to unshielded twisted pair (UTP) wiring, a port for connecting to coaxial cable, and a port for supporting the Attachment Unit Interface (AUI). Connected to each of these physical ports are various network interface devices for supporting the various available networking protocols, e.g., token ring, Ethernet, etc. Logic circuitry and control software are connected to the network interface devices. In order to determine the valid network connections to the individual ports, a short interrogation frame is successively transmitted by each of the network interface devices to each of the ports. Depending upon the status of each transmission, the system determines what type of network (if any) is connected to and by which type of physical medium. Based upon these two determinations, the workstation can be automatically configured without user intervention.

21 Claims, 5 Drawing Sheets

Transmit Status Register

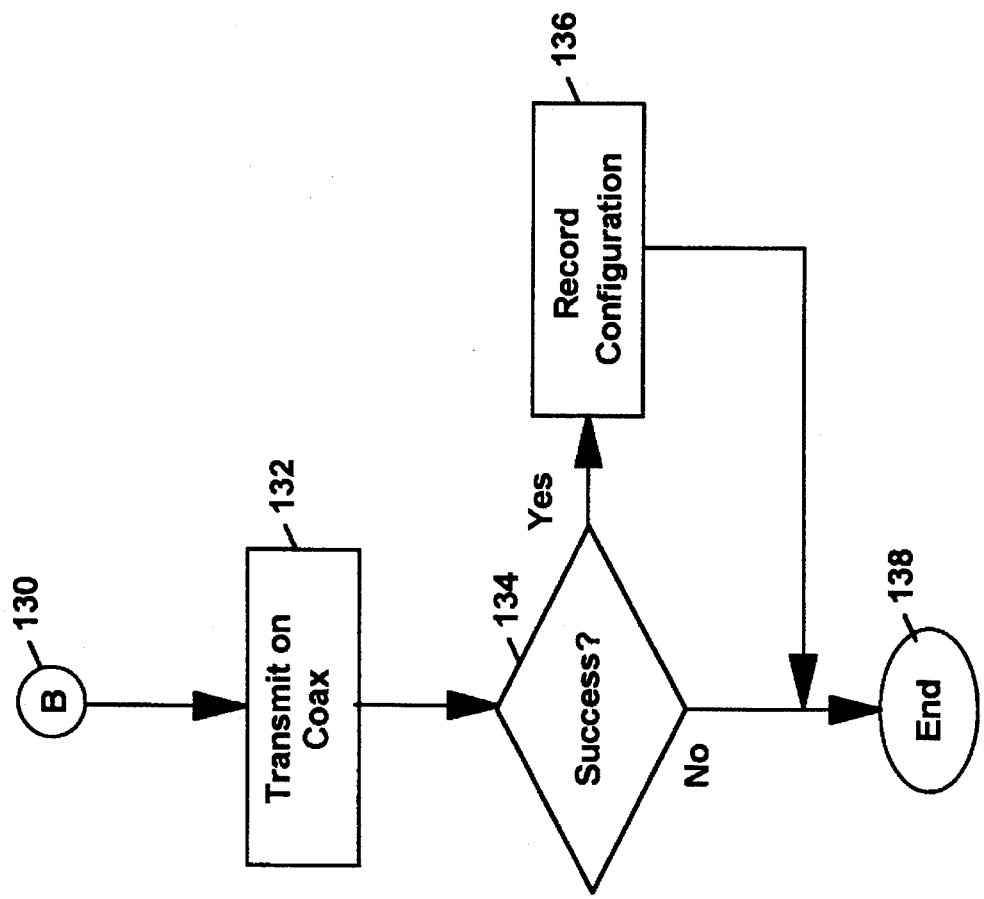

SYSTEM AND METHOD FOR DETERMINING NETWORK CONNECTIVITY

BACKGROUND OF THE INVENTION

I. Field of the Invention

The present invention relates to local area network adapters and, more particularly, to a system and method for automatically determining which type of local area network that a workstation is connected to and for automatically configuring the workstation for operating on the local area network.

II. Background and Prior Art

Rapid changes in digital communications networks have generated a multiplicity of network types, many of which co-exist. For example, different types of local area networks (LANs), such as token ring (as defined by IEEE 802.5 standard) and Ethernet (as defined by the IEEE 802.3 standard), may be installed and utilized by a particular organization. Each type of network has a useful function necessary in many business environments.

This ad hoc development and deployment of the various networking protocols has resulted in further non-compatibility for physical interconnection. Each networking protocol defines the physical interface, or the actual physical connectivity and medium, used by the network. This physical interface definition is analogous to the physical layer of the seven-layer Open Systems Interface (OSI) reference model. Examples are the use of unshielded twisted pair (UTP), shielded twisted pair (STP), coaxial cabling ("coax"), Attachment Unit Interface (AUI) or fiber optic cabling for the transmission of bit streams across the particular physical medium. Thus, a business having multiple networks, each of a unique protocol, many times has corresponding sets of wiring in its facility to accommodate them. In addition, many times, a particular LAN may operate over the same type of physical medium as another type of LAN. For instance, both token ring and Ethernet networks may utilize identical unshielded twisted pair cables and connectors.

There is a need in present day digital communications systems for immediate transparent workstation autoconfiguration capabilities where a workstation has capabilities for communicating on a number of different LAN protocols and/or physical media. This is becoming especially critical as communications becomes more "open" and computing becomes more portable. Presently, a workstation which has a multiprotocol LAN adapter, e.g., token ring and Ethernet, upon initialization needs to be configured by the user. For instance, the user needs to specify network connection information, such as the type of network (e.g., Ethernet, token ring, etc.), the type of connection from the adapter to the network (e.g., UTP, coaxial, AUI, etc.), and the speed of the network. The workstation needs to be configured not only upon initial installation but also upon network connection changes, such as when the workstation is moved to a different network connector port. For the user, this process is time-consuming and often frustrating as the user needs to manually toggle switches or key in data which the user may not know off-hand.

Presently, there is no system or method of automatically configuring a workstation based upon the type of LAN and medium that it is connected to. There is a need for such a system as portable laptop and palmtop personal computers become more prolific in their use. This requirement is shown by the existence of these and other PCs having network interface adapters supporting more than one LAN protocol and physical medium installed therein.

SUMMARY OF THE INVENTION

The present invention comprises a system (such as a multiprotocol LAN adapter) for use in a workstation, or other processing machine like a midrange or mainframe computing system, for automatically determining the type of network to which the workstation is connected and for automatically determining the type of physical medium to which the workstation is attached. The system comprises a plurality of different physical ports for supporting various available physical media over which network data may be transmitted. For example, the system may comprise a port for connecting to shielded twisted pair (STP) wiring, a port for connecting to unshielded twisted pair (UTP) wiring, a port for connecting to coaxial cable, and a port for supporting the Attachment Unit Interface (AUI). Connected to each of these physical ports are various network interface devices for supporting the various available networking protocols, e.g., token ring, Ethernet, etc. Logic circuitry and control software are connected to the network interface devices. In order to determine the valid network connections to the individual ports, a short interrogation frame is successively transmitted by each of the network interface devices to each of the ports. Depending upon the status of each transmission, the system determines what type of network (if any) is connected to and by which type of physical medium. Based upon these two determinations, the workstation can be automatically configured without user intervention.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

DETAILED DESCRIPTION OF THE PREFERRED EMBODIMENT

Figure 1:
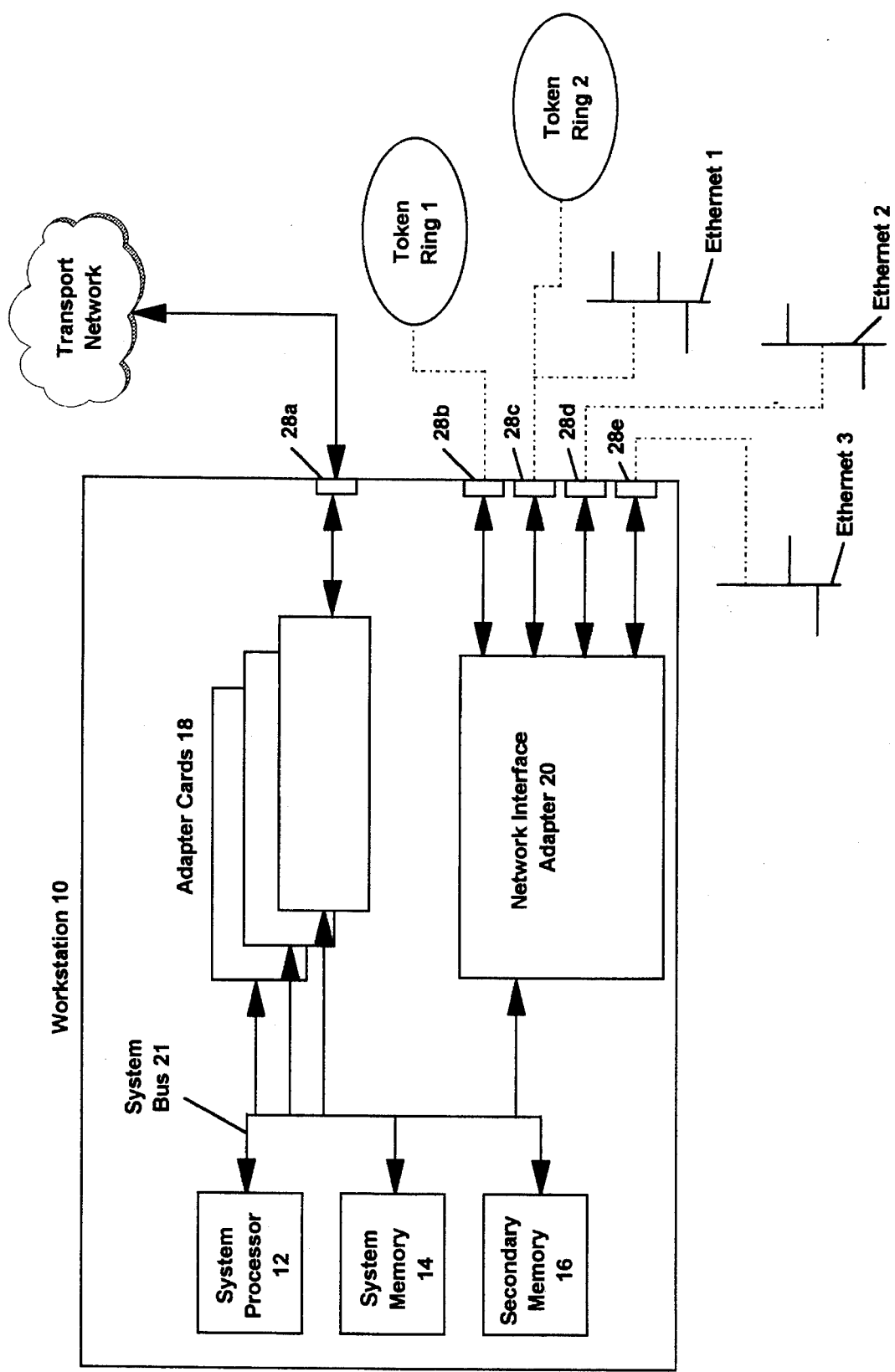
FIG. 1 is a block diagram of workstation having a network interface adapter comprising the system of the present invention.

FIG. 1 illustrates a workstation 10 comprising the automatic network and media type detection system of the present invention. The workstation 10 may be any type of processing machine but, in the preferred embodiment, it is a personal computer (PC), such as an IBM® PS/2® Model 90 personal computer. The workstation 10 comprises a system processor 12 for providing processing power, system memory 14 for providing memory space (normally random access memory (RAM)) in which the active workstation applications may be temporarily stored for easy access by the system processor 12, secondary memory 16 for providing a backing store (i.e., the hard disk), one or more removable adapter cards 18, each of which may provide a unique function, e.g., system memory expansion, internal modem for being connected to a transport network via external connector 28a, etc., for allowing the workstation to be suited for the user's needs, a network interface adapter 20 comprising the system of the present invention, and a system bus 21 (such as the IBM Micro Channel® bus) for allowing the various elements to communicate with one another. These elements provide a broad range of functionality to the user.

Figure 2:
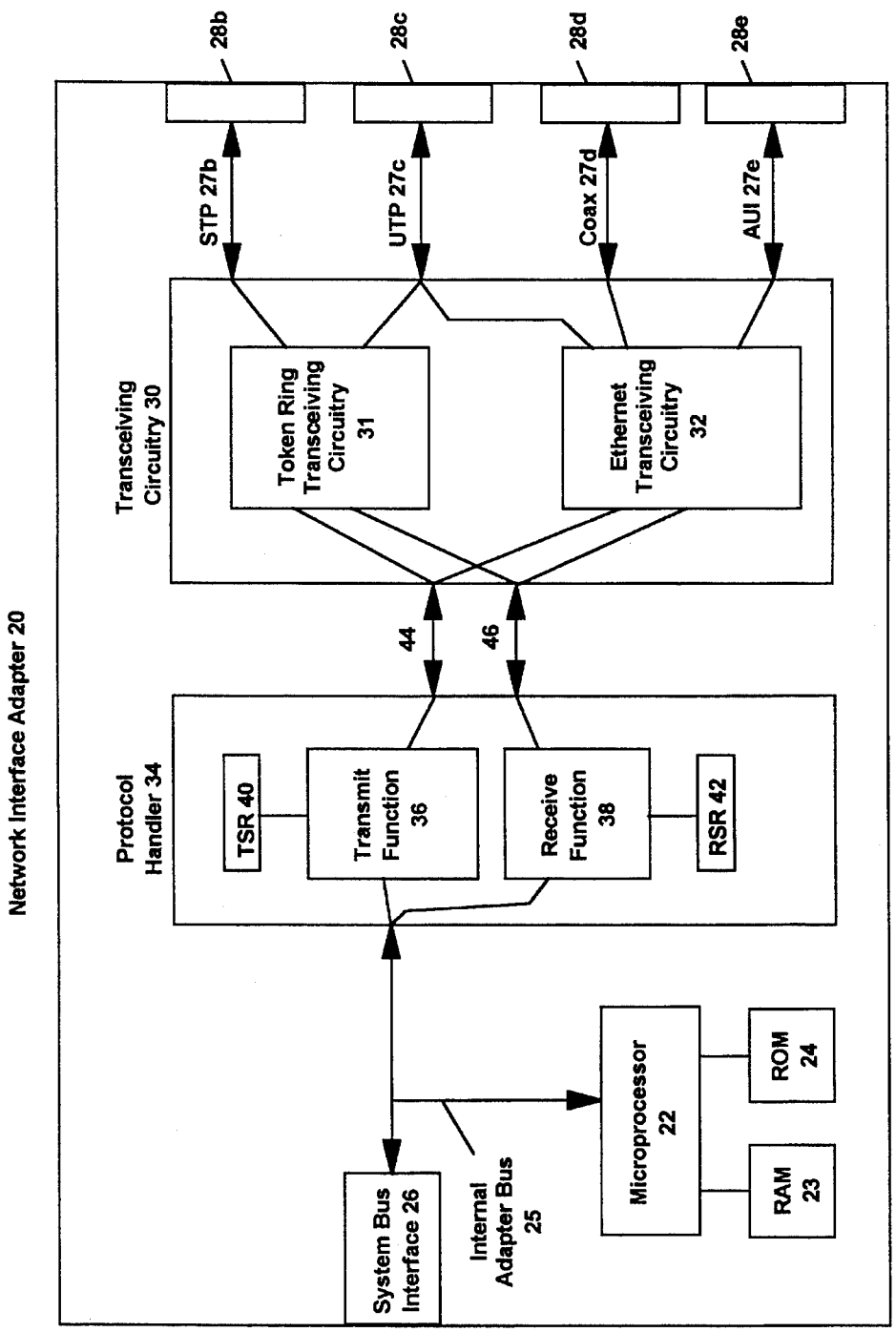
FIG. 2 is a block diagram of the network interface adapter comprising the system of the present invention.

In FIG. 2, the network interface adapter 20 is shown in greater detail. As can be seen, the network interface adapter 20 comprises a system bus interface 26 for providing an interface to the system bus 21, a microprocessor 22 for providing processing power to the network interface adapter 20, RAM 23 for providing temporary storage for the microprocessor 22, ROM (read only memory) 24 for storing the microprocessor's instructions, an internal adapter bus 25, a protocol handler 34 and transceiving circuitry 30 to be discussed in greater detail. The adapter 20 further has external ports, or connectors, STP connector 28b, UTP connector 28c, Coax connector 28d, and AUI connector 28e for providing connectivity to the various networks. Internal wiring STP 27b, UTP 27c, Coax 27d, AUI 27e, transmit wiring 44 and receive wiring 46 provide the adapter 20 with the remaining internal connectivity. The network interface adapter 20 may also include other elements for providing additional function which are unrelated to the detection system of the present invention and are not shown.

The connectors 28b, 28c, 28d and 28e provide physical connectivity to the various physical media that are available for network access. For instance, many times, a company will have a token ring network operating on shielded twisted pair (STP) or on unshielded twisted pair (UTP) wiring. UTP and STP wiring each consists of four copper conductors, each covered with insulation (usually polyvinyl chloride (PVC)), twisted about each other so that each is equally exposed to interfering signals picked up from the environment. This feature is especially important when differential transmission is used because, in differential transmission, information is conveyed by the difference in voltage between the two wires so that noise externally induced upon one will be equally induced upon the other having zero net effect. The shielding in STP increases the immunity to outside interference and may also be required if the circuitry driving the wire pair generates sufficient radio frequency interference (RFI) that shielding is necessary to comply with FCC regulations. Connectors 28b and 28c are adapted to receive token ring STP and UTP wiring, respectively.

Other times, coaxial cable ("coax"), which consists of a copper conductor surrounded by insulation, which is in turn surrounded by a tube-shaped conductor of solid copper, solid aluminum, or metal braid, is used because of the wide bandwidth it offers. Because of its ability to transfer low-frequency voltage levels, even DC voltages, coax is especially useful in baseband LAN systems, such as the Ethernet CSMA/CD ("carrier sense multiple access with collision detection") system, where the DC voltage level is used to detect collisions. Connector 28d is configured to be connected to another coaxial cable-type connector, such as a BNC connector.

Attachment Unit Interface (AUI) is another interface definition which may be utilized in a particular LAN environment. AUI, which is defined by the IEEE 802.3 standard, is comprised of data out (DO), data in (DI), control out (CO) and control in (CI) circuits. AUI provides function in addition to the physical connectivity to the Ethernet LAN. For instance, the AUI provides the collision detection required in an Ethernet LAN environment. Connector 28e is configured to support an AUI.

Connected to the connectors 28b, 28c, 28d and 28e, by internal wiring STP 27b, UTP 27c, Coax 27d, and AUI 27e, is transceiving circuitry 30. For the purposes of this specification, the term "transceiving circuitry" will be used to represent the signal conversion device whose function is to convert digital data into a form suitable for transmission over the medium being used, and to convert signals received over the medium back into digital data. Transceiving circuitry is required because, despite the short distances spanned by LANs, the electrical characteristics of the media used and the possibility of electrical noise pickup preclude the use of conventional logic signaling levels such as would be used within computers attached to the network. In LANs designed to cover a small area, such as a few offices, line drivers and receivers perform adequate signal conditioning and provide adequate noise immunity. Many of these use signaling which meets the requirements of the EIA RS-232-C, RS-422, or RS-423 standards. Simple line drivers, using either RS-422 or a proprietary design, are also used in some ring networks that use wire centers (or "hubs"). Other LANs, particularly those that operate at speeds above a megabit per second and/or cover a distance of more than a kilometer, utilize more elaborate signaling systems that require transceivers or modems. Transceivers perform a function similar to that of the line drivers used in smaller, slower systems, but transceivers span greater distances, provide a greater degree of electrical isolation, have improved noise rejection and are generally more complex and costly. Modems are used to transmit data great distances.

Transceiving circuitry 30 comprises token ring transceiving circuitry 31 and Ethernet transceiving circuitry 32. The token ring transceiving circuitry 31, connected to the STP and UTP ports 28b and 28c, respectively, provides the transceiving function for token ring LANs. Likewise, the Ethernet transceiving circuitry 32, connected to the UTP, Coax and AUI ports 28c, 28d and 28e, respectively, provides the transceiving function for Ethernet LANs.

Connected to the transceiving circuitry 30 is a protocol handler 34. Protocol handler 34 conveys digital data to the transceiving circuitry 30 for conversion into a form suitable for transmission over the medium being used and receives digital data from the transceiving circuitry 30 received over the medium. Protocol handler 34 is responsible for a number of tasks for the transmission/reception of data to/from the network. Protocol handler 34 handles these tasks utilizing transmit function circuitry 36 and receive function circuitry 38. Before transmission begins, the protocol handler 34 must perform network access control functions. In a token ring or token bus, the transmit function circuitry 36 must await word from the receive function circuitry 38 that the token has been received while in CSMA/CD systems, the transmit function circuitry 36 must await the no-carrier condition (and the expiration of a time-out if a collision occurred on the previous transmission attempt). Further, the protocol handler 34 performs other protocol specific functions such as formatting a frame to be transmitted via a network into the proper format as defined by the protocol. This includes, for example, adding starting and ending delimiters, and calculating the value of the cyclic reduncy check (CRC) and adding it to the CRC field.

Once transmission has begun, the transmit function circuitry 36 primarily monitors correct operation. In addition, in token ring, after a frame has been transmitted, the transmit function circuitry 36 must "strip" the transmitted frame from the network after it completes the ring. The status of the transmission can be detected based upon the "stripped" frame. The status of the transmission is stored by the transmit function circuitry 36 in a transmit status register (TSR 40) to be discussed in greater detail.

In a CSMA/CD network, the transmit function circuitry's monitoring task begins immediately when transmission starts, as it must check the collision detection lead from the transceiver circuitry 30 to determine whether a collision has been detected. As with token ring, the status of the transmission is stored in the transmit status register 40.

The protocol handler's receive function circuitry 38 must perform four tasks: finding the beginning of the message, address recognition, finding the end of the message, and (in some cases) checking the validity of the message. In addition to these functions, most LANs require the receiver to perform network operational integrity functions. The status of the reception is stored by the receive function circuitry 38 in a receive status register 42. The receive function circuitry 38 is not particularly relevant to the present invention so it will not be discussed any further.

In operation, an LLC (Logical Link Control) "interrogation" frame is transmitted to each of the external connectors 28b, 28c, 28d and 28e, individually and in a predetermined order. It should be noted that the invention is described in terms of four connectors (28b, 28c, 28d and 28e) and two network protocols (token ring, Ethernet) only for the purposes of describing the invention. A greater number of connectors may be used supporting a greater number of network types using the present invention. The transmitted frame is termed an interrogation frame as its purpose is have an "interrogatation" of the system in order to determine which valid connections are made to the external ports 28b, 28c, 28d, 28e. Specifically, in the present example, it needs to be determined whether a token ring network is connected to STP port 28b and/or to UTP port 28c, and whether an Ethernet network is connected to UTP port 28c, Coax port 28d, and/or AUI port 28e.

The results of the individual transmissions are stored temporarily in the transmit status register 40, polled by the microprocessor 22, and stored for future use in RAM 23. In particular, the microprocessor 22, based upon code programmed in the ROM 24, requests that the protocol handler 34 transmit a specified LLC interrogation frame conforming to a specified protocol on a specified connector. For instance, microprocessor 22 may issue a request for an Ethernet LLC interrogation frame transmission to external connector 28c which is a connector for a UTP cable—connected either to a token ring network or an Ethernet network. The protocol handler 34 receives this request, builds the interrogation frame per the specified protocol's requirements (in this example, per the Ethernet standard (802.3)) and conveys the digital data to the transceiving circuitry 30 for conversion into a form suitable for transmission over the medium being used as defined by the external connector specified. For instance, where the Ethernet interrogation frame is being transmitted via external connector 28c, the Ethernet transceiving circuitry 32 converts the interrogation frame into a form suitable for transmission over the UTP medium.

After the interrogation frame has been transmitted, the transmit function circuitry 36 monitors the results of the transmission. The status of the transmission is stored by the transmit function circuitry 36 in the transmit status register 40.

Figure 4A:
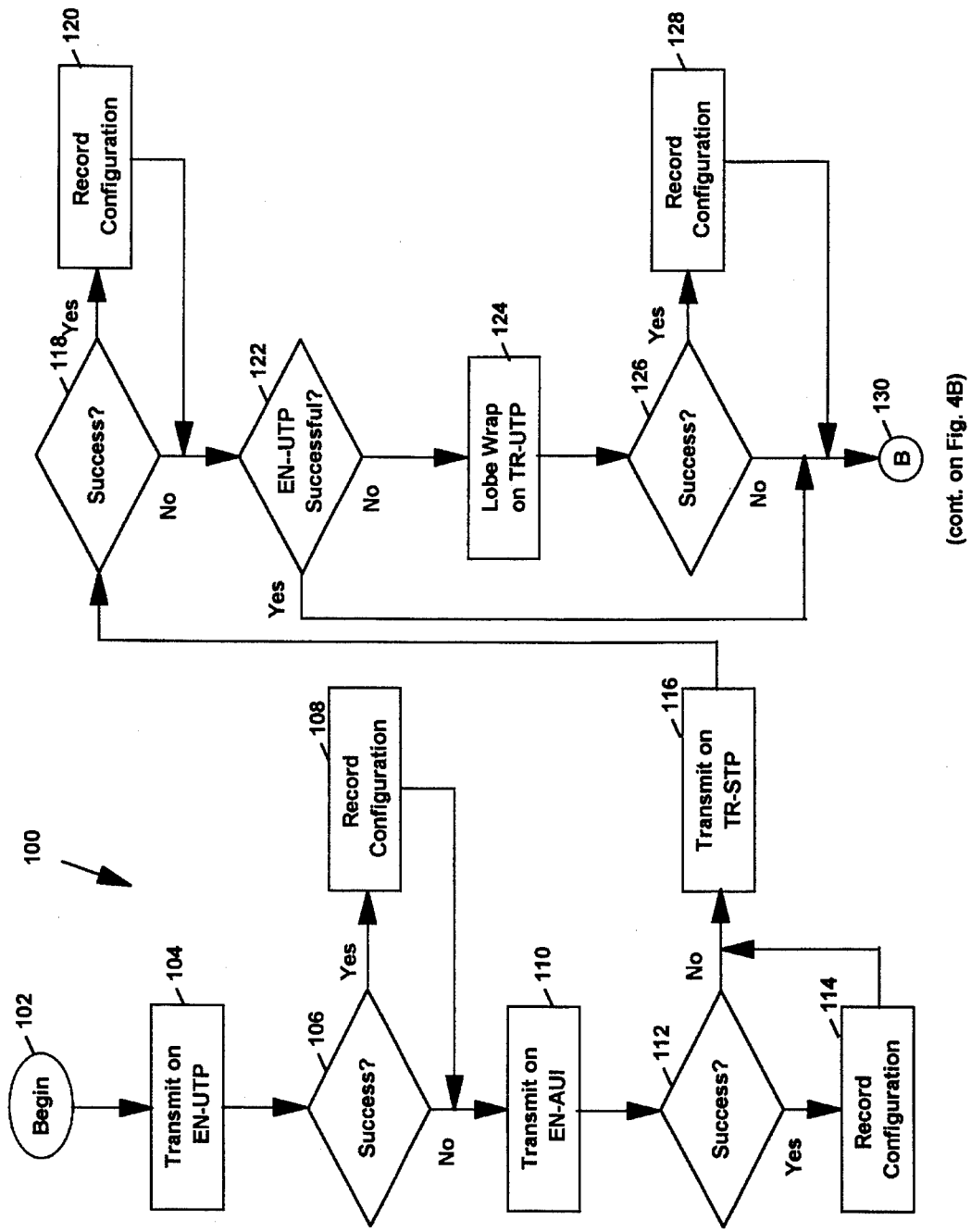
FIG. 4 (comprising FIGS. 4A and 4B) is a flow chart illustrating the method of determining the type of network and physical media of the present invention.

Once the transmit status register 40 contains the status of the interrogation frame's transmission, the microprocessor retrieves this status from the protocol handler 34, stores it in RAM 23 and requests that an interrogation frame be issued to the next external connector, to the Ethernet AUI connector 28e, for instance. After the interrogation frame has been transmitted, the transmit function circuitry 36 monitors the results of the transmission and stores the status transmission in the transmit status register 40. The microprocessor retrieves this status from the protocol handler 34, stores it in RAM 23 and requests that an interrogation frame be issued to the next external connector, and so forth, until all of the connectors and protocols have been tested. Based upon the contents of the transmit status register 40, the microprocessor 22 can determine which connectors, if any, are connected into a network and, if so, to which type of network are they connected. For instance, with regard to connector 28c, in this example, there three possible conditions: (1) no cable is connected to the connector 28c; (2) a UTP cable is connected to connector 28c at one end and to a token ring concentrator at the other end; and (3) a UTP cable is connected to connector 28c at one end and to a Ethernet network at the other end. Based upon the contents of the transmit status register 40 after the various interrogation frame transmissions via these connectors, the valid network connections to the adapter can be "sensed" and the adapter can be automatically configured. The detailed flow chart of this method is illustrated in FIG. 4 (comprising FIGS. 4A and 4B) to be discussed below.

In accordance with the IEEE 802.3 and IEEE 802.5 standards, frame formats for Ethernet (CSMA/CD) and token ring are shown in Tables 1A and 1B below.

TABLE 1A

| CSMA/CD | | | | | | |
|---|---|---|---|---|---|---|
| Preamble | SFD | DA | SA | Length | Data + Pad | FCS |

TABLE 1B

| Token ring | | | | | | | |
|---|---|---|---|---|---|---|---|
| SD | AC | FC | DA | SA | Info | FCS | ED | FS |

Regarding the CSMA/CD frame, the fields are as follows:
1. Preamble—a 7-octet pattern used to establish bit synchronization;
2. Start frame delimiter (SFD)—indicates the start of the frame;
3. Destination address (DA)—specifies the station(s) for which the frame is intended;
4. Source address (SA)—specifies the station which sent the frame;
5. Length—specifies length of data field;
6. Data+Pad—data to be sent and pad (a sequence of octets added to assure that the frame is long enough for proper CD operation;
7. Frame check sequence (FCS)—a 32-bit cyclic redundancy check value.

Regarding the token ring frame, the fields are as follows:
1. Starting delimiter (SD)—an 8-octet pattern used to start each frame;
2. Access control (AC)—indicates various parameters about the frame such as whether it is a token or data frame, and its priority;
3. Frame control (FC)—indicates whether frame is an LLC data frame;
4. Destination address (DA)—specifies the station(s) for which the frame is intended;

5. Source address (SA)—specifies the station which sent the frame;
6. Data—data to be sent;
7. Frame check sequence (FCS)—a 32-bit cyclic redundancy check value;
8. Ending delimiter (ED)—contains the error detection indicator (EDI) bit; and
9. Frame status (FS)—contains frame copied indicator (FCI) bit.

With regard to the specific interrogation frame to be transmitted, the Protocol Handler 34 has the responsibility of creating and calculating (in the case of FCS) the CSMA/CD and token ring specific fields, i.e., the Preamble, SFD, and FCS for CSMA/CD and SD, FCS, ED and FS for token ring, and assembling the interrogation frame for transmission via the appropriate connector. Regarding the remaining fields, the format is shown in Table 2.

TABLE 2

| Interrogation Frame Data (Hex) | Description of Data |
| --- | --- |
| 1040 | AC/FC, TR only |
| xxxxxxxxxxxx | Destination Address (adapter's address) |
| xxxxxxxxxxxx | Source Address (adapter's address) |
| 000000000000 | Data |
| 000000000000 | Data |
| 000000000000 | Data |
| 000000000000 | Data |
| 000000000000 | Data |
| 000000000000 | Data |
| 000000000000 | Data |
| 000000000000 | Data |
| 00000000 | Data |

The AC/FC fields (having the contents of "1040"), in the token ring interrogation frame only, indicates the interrogation frame's priority, that the interrogation frame is not a token, and that the interrogation frame is an LLC frame. Both the DA and SA fields comprise the adapter's address so that no other station on any connected network will attempt to receive the interrogation frame (as it is merely for interrogation purposes). The remainder of the interrogation frame is filled with 0s so that the minimum frame size for CSMA/CD requirements is reached.

Figure 3:
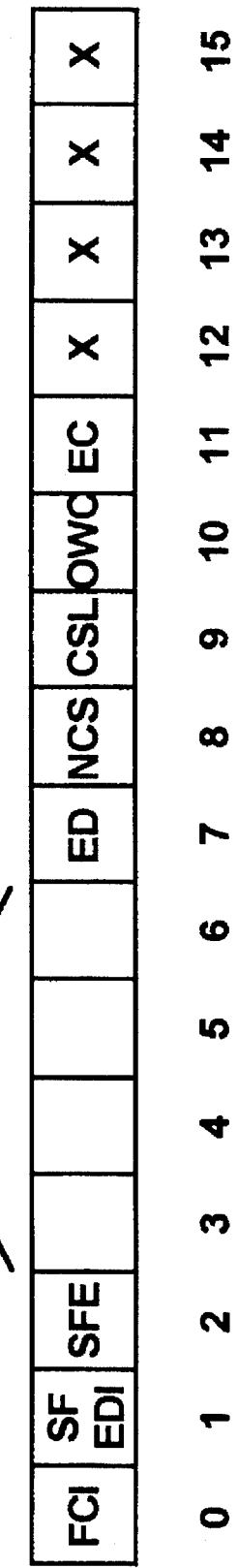
FIG. 3 is a diagram showing the contents of a transmit status register used in the present invention.

FIG. 3 illustrates a sample format of the transmit status register 40 shown in FIG. 2. In this sample, the transmit status register 40 comprises 16 bits, bit 0 through bit 15. The state of each one of these bits may be checked and its contents reported to the microprocessor 22 by the transmit function circuitry 36 upon request of the microprocessor 22. The bit definitions are shown in Table 3 below:

TABLE 3

| Bit | Definition | Protocol |
| --- | --- | --- |
| 0 | Frame Copy Indicator (FCI) | Token-ring |
| 1 | Strip Frame Error Detection Indicator | Token-ring |

TABLE 3-continued

| Bit | Definition | Protocol |
| --- | --- | --- |
|  | (SF EDI) |  |
| 2 | Strip Frame Error (SFE) | Token-ring |
| 3 | Transmit Completion Code | Token-ring/ Ethernet |
| 4 | Transmit Completion Code | Token-ring/ Ethernet |
| 5 | Transmit Completion Code | Token-ring/ Ethernet |
| 6 | Transmit Completion Code | Token-ring/ Ethernet |
| 7 | Excessive Deferral (ED) | Ethernet |
| 8 | No Carrier Sense (NCS) | Ethernet |
| 9 | Carrier Sense Lost (CSL) | Ethernet |
| 10 | Out of Window Collision (OWC) | Ethernet |
| 11 | Excessive Collision (EC) | Ethernet |
| 12 | Don't care | Unused |
| 13 | Don't care | Unused |
| 14 | Don't care | Unused |
| 15 | Don't care | Unused |

A breakout of the bit representations is given below:

| Bit | Name | Meaning |
| --- | --- | --- |
| 0 | FCI (token ring) | indicates that the transmitted frame was copied by Destination Station |
| 1 | SF EDI (token ring) | indicates that a station on the ring detected an error and set this bit |
| 2 | SFE (token ring) | indicates that frame to be stripped by the source station detects an error |
| 3-6 | Transmit Completion Code (token ring/ CSMA/CD) | indicates various errors detected by the source station such as non-receipt of frame to strip |
| 7 | ED (CSMA/CD) | indicates that there has been excessive deferral due to network activity |
| 8 | NCS (CSMA/CD) | indicates no activity on the network |
| 9 | CSL (CSMA/CD) | indicates that, during receipt of frame, the carrier was lost |
| 10 | OWC (CSMA/CD) | indicates an invalid collision |
| 11 | EC (CSMA/CD) | indicates an excessive number of collisions, i.e., over 16 |

The transmit function circuitry 36 sets or resets the bits in the transmit status register 40 based upon the status of a transmission. For instance, in CSMA/CD, if there are excessive collisions detected by the adapter, bit 11 (Excessive Collision) is set by the transmit function circuitry 36.

In Table 4, the contents of the transmit status register are shown when: 1) when there is a successful token ring interrogation frame transmission, i.e., the LLC interrogation frame was transmitted via one of the token ring ports (STP 28b or UTP 28c) and was successfully received by the adapter (via the lobe wrap) and stripped from the network by the adapter; and 2) when there is a successful Ethernet interrogation frame transmission via any of ports UTP 28c, Coax 28d and AUI 28e.

TABLE 4

| Network Protocol | Transmit Status Register Contents | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Token-ring | 0 | 0 | 0 | 0 | 0 | 0 | 0 | X | X | X | X | X | X | X | X | X |
| Ethernet | X | X | X | 0 | 0 | 0 | 0 | 0 | 0 | 0 | 0 | 0 | X | X | X | X |

In particular, with regard to the token ring, the interrogation frame is transmitted to either STP connector 28b or UTP connector 28c. If a token ring cable is connected between the connector and a concentrator, a standard "lobe wrap" is established in the concentrator (or in the cable in the case of STP cabling). With lobe wrap, the transmitted interrogation frame is wrapped back to the connector. Where a token ring cable is properly installed between the connector and the concentrator, all of the token ring bits of the transmit status register (bits 0–6) will be reset, or "0". In particular, the FCI will not be set because no other station has received the interrogation frame to copy it, SF EDI will not be set because no other station has received the interrogation frame to detect an error, SFE will not be set as the interrogation frame should be a valid length, and the transmit completion code should be zero indicating a successful transmit, e.g., no internal adapter errors were detected.

Referring now to FIG. 4 (comprising FIGS. 4A and 4B), a flowchart 100 illustrating the method of the present invention is depicted. The method begins at 102. At 104, the Ethernet transceiving circuitry 32 transmits the interrogation frame (illustrated above) on UTP 27c to connector UTP 28c. At 106, the microprocessor 22 checks the transmit status register 40 to determine whether the interrogation frame transmission was a success, i.e., does the transmit register contents match those of Table 4. If so, at 108, this configuration (that an Ethernet network is attached to the UTP connector 28c) is recorded in RAM 23. At 110, the Ethernet transceiving circuitry 32 transmits the interrogation frame on AUI 28e. At 112, the microprocessor 22 checks the transmit status register 40 to determine whether the interrogation frame transmission was a success and, if so, at 114, records this configuration in RAM 23. At 116, the token ring transceiving circuitry 31 transmits the interrogation frame on STP 28b. At 118, the microprocessor 22 checks the transmit status register 40 to determine whether the interrogation frame transmission was a success and, if so, at 120, records this configuration in RAM 23. At 122, the microprocessor 22 determines whether the previously conducted Ethernet UTP test was successful, and if so, skips the token ring UTP test (steps 124, 126, and 128) to step 130 because an Ethernet network is connected to that connector. If not, at 124, the token ring transceiving circuitry 31 transmits the interrogation frame on the UTP connector 28c. At 126, the microprocessor 22 checks the transmit status register 40 to determine whether the interrogation frame transmission was a success and, if so, at 128, records this configuration in RAM 23. The flow diagram to this method is continued at B 130 in FIG. 4B. At 132, the Ethernet transceiving circuitry 31 transmits the interrogation frame on coax 28d. At 134, the microprocessor 22 checks the transmit status register 40 to determine whether the interrogation frame transmission was a success and, if so, at 136, records this configuration in RAM 23.

The results of each of the tests for the external connectors are stored in RAM 23. These results represent the present configuration of the adapter card regarding to which network(s) it is connected. This configuration can be sent to the system processor 12 of workstation 10 (FIG. 1) after the tests are completed. In this way, the system processor 12 is aware of the resources available to it and can manage its own resources accordingly.

In addition, the method described above can be performed at any time as it requires no manual intervention such as connecting or disconnecting cables and, because of the interrogation frame format, no disruption of a connected network will occur.

Thus, it can be seen that the method and system of the present invention allows network workstations to automatically "sense" its present physical configuration in one or more networks without any manual intervention. The various networks (e.g., token ring, Ethernet) can be disconnected and reconnected to another port of the system (if the appropriate cable is used) and be automatically sensed by the system and method of the present invention. This is accomplished through the unique utilization of the transmission of an interrogation frame to each of the known ports of the adapter and the determination of the configuration, i.e., what networks are validly connected to which ports, without any manual intervention or network disruption. It is in this manner that the workstation may be physically connected to any available network (that is supported by the adapter of the present invention) and be automatically configured without the user needing to know any of the details of the physical connectivity. While the invention has been particularly shown and described with reference to preferred embodiments thereof, it will be understood by those skilled in the art that various other changes in form and detail may be made without departing from the spirit and scope of the invention.

What is claimed is:

1. A system for use with a processing machine for providing access to one or more networks via one or more ports, each of said networks conforming to a particular networking protocol of a set of networking protocols, said system comprising:

one or more ports for providing connectivity to said one or more networks;

means, connected to said ports, for interrogating each of said one or more ports for determining the connectivity of any of said one or more networks at each of said one or more ports, said interrogating means comprising:

means for successively transmitting an interrogation signal to each of said one or more ports;

means connected to each of said one or more ports for monitoring the status of each interrogation signal transmission;

means, connected to said monitoring means, for determining the connectivity and the particular networking protocol of said set of networking protocols of said one or more networks at each of said one or more ports based upon the status of each interrogation signal transmission; and means, connected to said determining means, for generating an output indicative of said network connectivity and said particular networking protocol.

2. The system defined in claim 1 further comprising means for interfacing with said processing machine, said interfacing means being connected to said output generating means for receiving said output indicative of said network connectivity.

3. The system defined in claims 1 or 2 further comprising means, connected to said signal transmitting means, for generating an interrogation frame in digital form, and further wherein said signal transmitting means comprises means for receiving and for converting said interrogation frame from digital form into analog form, for transmitting said analog form interrogation frame via said one or more ports, for receiving analog form status of said transmitted interrogation frame from said one or more ports, and for converting said analog form status into digital form.

4. The system defined in claim 3 wherein said status monitoring means is connected to said signal transmitting means for receiving said digital form communications and comprises a transmit status register having contents representing the status of said interrogation signal transmission, said determining means determining said network connectivity based upon said contents.

5. The system defined in claim 1 wherein at least one of said networks is an Ethernet network and further wherein said status monitoring means comprises means for determining whether there have been excessive collisions and whether there have been excessive deferrals.

6. The system defined in claim 1 wherein at least one of said ports is a connector adapted for receiving a shielded twisted pair (STP) cable which is connected to a token ring network or an Ethernet network and another is a connector adapted for receiving an unshielded twisted pair (UTP) cable which is connected to token ring network or an Ethernet network.

7. The system defined in claim 1 wherein said one or more ports provide physical connectivity to said one or more networks.

8. The system defined in claims 1 or 7 wherein said determining means comprises means for determining whether each of said one or more ports has a valid physical connection to one of said one or more networks based upon the status of each interrogation signal transmission.

9. The system defined in claim 1 wherein said interrogation signal transmitting means comprises means for successively transmitting an interrogation signal conforming to a first networking protocol of said set of networking protocols to a first portion of said one or more ports and further comprises means for successively transmitting an interrogation signal conforming to a second networking protocol of said set of networking protocols to a second portion of said one or more ports.

10. A system accessing one or more networks via one or more ports, each of said networks conforming to a particular networking protocol of a set of networking protocols, said system comprising:

one or more ports for providing connectivity to said one or more networks;

means, connected to said ports, for interrogating each of said one or more ports for determining the connectivity of any of said one or more networks at each of said one or more ports, said interrogation means comprising:

means for successively transmitting an interrogation signal to each of said one or more ports;

means connected to each of said one or more ports for monitoring the status of each interrogation signal transmission;

means, connected to said monitoring means, for determining the connectivity and the particular networking protocol of said set of networking protocols of said one or more networks at each of said one or more ports based upon the status of each interrogation signal transmission; and means, connected to said network connectivity determining means, for generating an output indicative of said network connectivity and the particular networking protocol; and means, connected to said ports, for communicating over an available one of said networks.

11. For use in a system, said system configured for use with a processing machine for communicating over one or more networks, said system providing connectivity to said one or more networks via one or more ports, each network conforming to a protocol type of a set of protocol types, a method for automatically determining the connectivity of said one or more networks at each of said one or more ports comprising the steps of:

a) transmitting an interrogation signal to a first port of said one or more ports;

b) monitoring the status of said interrogation signal transmission;

c) determining the connectivity and the particular networking protocol of said set of networking protocols of said one or more networks at said first port based upon the status of said interrogation signal transmission; and d) generating an output indicative of said network connectivity and the particular networking protocol at said first port.

12. The method defined in claim 11 further comprising, after step d, the steps of e) transmitting an interrogation signal to a second port said one or more ports, f) monitoring the status of said second interrogation signal transmission, g) determining the connectivity of said one or more networks at said second port based upon the status of said second interrogation signal transmission, h) generating an output indicative of said network connectivity at said second port, and i) repeating steps e through h for a remaining selected portion of said one or more ports.

13. The method defined in claims 11 or 12 wherein the interrogation signal of step a conforms to a first protocol type of said set of protocol types, and further wherein said method further comprises the steps of j) transmitting a second interrogation signal conforming to a second protocol type of said set of protocol types to a first port said one or more ports; k) monitoring the status of said second interrogation signal transmission; l) determining the connectivity of a network conforming to said second protocol type of said set of protocol types at said first port based upon the status of said second interrogation signal transmission; and m) generating an output indicative of the connectivity a network conforming to second protocol type of said set of protocol types at said first port.

14. The method defined in claim 13 wherein said set of protocol types comprises a token ring protocol and an Ethernet protocol and said first protocol type is the token ring protocol and said second protocol type is the Ethernet protocol.

15. The method defined in claim 11 wherein said interrogation signal is a data frame having a source address and a destination address, said source address and said destination address being the address of said system.

16. The method defined in claim 11 wherein step c further comprises the step of determining whether each of said one or more ports has a valid physical connection to one of said one or more networks based upon the status of each interrogation signal transmission.

17. For use in a system for communicating over one or more networks via one or more ports in the system, each network being a protocol type of a set of protocol types, a method for automatically determining connectivity of said one or more networks at each of said one or more ports comprising the steps of:

a) transmitting an interrogation signal to a first port of said one or more ports;

b) monitoring the status of said interrogation signal transmission;

c) determining the connectivity and the particular networking protocol of said set of networking protocols of said one or more networks at said first port based upon the status of said interrogation signal transmission; and d) generating an output indicative of said network connectivity and the particular networking protocol at said first port.

18. The method defined in claim 17 further comprising, after step d, the steps of e) transmitting an interrogation signal to a second port said one or more ports, f) monitoring the status of said second interrogation signal transmission, g) determining the connectivity of said one or more networks at said second port based upon the status of said second interrogation signal transmission, h) generating an output indicative of said network connectivity at said second port, and i) repeating steps e through h for the remaining ports of said one or more ports.

19. The method defined in claim 18 further comprising step j, after step i, of communicating over one of said available networks.

20. The method defined in claims 17, 18 or 19 wherein the interrogation signal of step a conforms to a first protocol type of said set of protocol types, and further wherein said method further comprises the steps of j) transmitting a second interrogation signal conforming to a second protocol type of said set of protocol types to a first port said one or more ports; k) monitoring the status of said second interrogation signal transmission; l) determining the connectivity of a network conforming to said second protocol type of said set of protocol types at said first port based upon the status of said second interrogation signal transmission; and m) generating an output indicative of the connectivity a network conforming to second protocol type of said set of protocol types at said first port.

21. The method defined in claim 17 wherein step c further comprises the step of determining whether each of said one or more ports has a valid physical connection to one of said one or more networks based upon the status of each interrogation signal transmission.

* * * * *